United States Patent [19]
Yokel

[11] 3,727,431
[45] Apr. 17, 1973

[54] FLEXIBLE TORSIONAL COUPLING
[75] Inventor: Edward C. Yokel, Racine, Wis.
[73] Assignee: Twin Disc, Incorporated, Racine, Wis.
[22] Filed: Oct. 12, 1971
[21] Appl. No.: 188,200

[52] U.S. Cl. .....................64/27 NM, 64/14, 192/55, 192/113 A, 188/1 B
[51] Int. Cl. .............................................B16d 3/10
[58] Field of Search..................64/27 NM, 14, 11 R, 64/27 R; 192/55, 70.17, 113 A; 188/1 B; 74/574

[56] References Cited

UNITED STATES PATENTS

| | | | |
|---|---|---|---|
| 1,948,304 | 2/1934 | Mass | 64/27 NM |
| 3,386,264 | 3/1966 | Paulsen | 64/27 NM |
| 1,780,727 | 11/1930 | Tenney | 64/27 NM |
| 2,779,210 | 1/1957 | Holloway | 192/113 A |
| 3,107,551 | 10/1963 | Cline | 74/574 |

FOREIGN PATENTS OR APPLICATIONS

| | | | |
|---|---|---|---|
| 837,659 | 6/1960 | Great Britain | 64/27 NM |

Primary Examiner—Charles J. Myhre
Assistant Examiner—Randall Heald
Attorney—James E. Niiles

[57] ABSTRACT

A coupling for transmitting power in a transmission or the like, and having an inner and outer member concentrically located together and furthermore having a flexible material such as rubber bonded between and connecting the inner and outer members. The flexible material forms a torsional connecting member which can act in shear to absorb torsional fluctuations between the two members and transmit normal driving torque between the members. In addition to the flexible material connecting the two members, interengagable means are provided between the two members which can form a mechanical drive in the event that the torque between the members exceeds a predetermined amount. Normally, the mechanical connection is not engaged but comes into play only when the rubber material deflects in shear beyond a predetermined amount due to excessive torque between the members.

16 Claims, 4 Drawing Figures

INVENTOR:
EDW. C. YOKEL

INVENTOR:
EDW. C. YOKEL
BY: James E. Miller
ATTORNEY

FLEXIBLE TORSIONAL COUPLING

BACKGROUND OF THE INVENTION

The invention pertains to power transmitting devices and more particularly, to a flexible torsional coupling which can transmit torque and which can resiliently yield when excessive torque requirements are placed on the drive.

Prior art devices have generally proposed to provide a resilient or interengaging members between two rotatable parts for forming a yieldable connection between the parts. However, these devices have not proved to be satisfactory in all respects and did not provide sufficient versatility in transmitting loads under extreme torque transmitting conditions.

In power transmitting apparatus for marine work, where the present invention finds particular utility, in large powerful craft, a change in direction of the marine transmission shaft and propeller is often necessary and must be accomplished rapidly and before the craft can be completely stopped and then reverse its direction. In such environments, where the present invention finds particular utility, failure has occurred in the drive line due to these overloading conditions.

The present invention finds particular utility in marine power transmission systems as found in the U.S. patent application Ser. No. 32,914, filed Apr. 29, 1970 and entitled Power Transmission of the Hydraulically Actuated Friction Type Clutch by McRoberts and Arnold, which issued as U.S. Pat. No. 3,613,469 on Oct. 19, 1971.

In marine power transmission systems there is usually an engine housing to which is secured a transmission housing. When the marine engine crankshaft and its flywheel and its housing group are all assembled, there is a certain accuracy of the flywheel to its face. Furthermore, when the marine transmission is assembled with its housing bearings and shaft system, its input shaft accuracy has a certain relationship to its mounting fact. Then when the two housings are assembled together, there is usually some misalignment therebetween.

In addition to the above mentioned problems due to the change in direction of the crankshaft, other problems are attendent in transmissions of this type, for example, due to the sudden change of speed of the propeller shaft when it strikes an obstruction such as logs, sand bars, wire rope and other debris. The resultant sudden slowing and even stopping of the drive shaft induces sever shock loads through the transmission and up into the engine. The massive engine flywheel then provides the inertia for resistance to the change thereby causing high input shaft loads.

Furthermore, the gears and clutches tend to have sufficient inertia to cause relative high output torque loads under the conditions which causes the propeller to stop.

SUMMARY OF THE INVENTION

The flexible coupling provided by the present invention provides reasonable amounts of angular misalignment and offset misalignment between the engine shaft and the transmission shaft referred to above. In addition, the flexible coupling provided by the present invention materially helps maintain the shaft stresses at a reduced value by reducing the peak torque of the shock loads imposed on the transmission.

The present invention provides a flexible torsional coupling for a power transmitting apparatus and in which a part of concentrically located members have a flexible material such as rubber bonded therebetween. The rubber acts in shear under normal operating conditions to thereby smooth out the torque fluctuations and to also dampen shock loads occasioned by reversal of the direction of the drive. In addition, the coupling of the present invention has a normally disengaged mechanical drive between the concentric members, which drive comes into play upon excessive torque loads imposed on the drive. More specifically, the mechanical connection includes interengaging, radially extending abutments between the inner and outer concentric members and which are normally disengaged during which time the rubber material transmits the torque between the members. Upon the application of severe torque loads, the rubber material acts in shear and deforms sufficiently to permit the radially extending abutments to come in contact with one another, thereby forming a solid mechanical drive. In addition, another aspect of the invention relates to provide a resilient cushion between the radially extending abutments so that the engagement of the abutting members is cushioned and this is important because the engaging is usually made at high speeds and high impact forces.

Another aspect of the invention relates to a particularly efficient means for cooling the entire coupling, including the flexible material between the inner and outer concentric parts.

Still another aspect of the invention relates to the inertia means for adding mass to the coupling to thereby lower the critical speed of the entire marine gear package.

These and other objects and advantages of the present invention will appear hereinafter as this disclosure progresses, reference being made to the accompanying drawings.

DESCRIPTION OF THE INVENTION

Figures 1, 3:
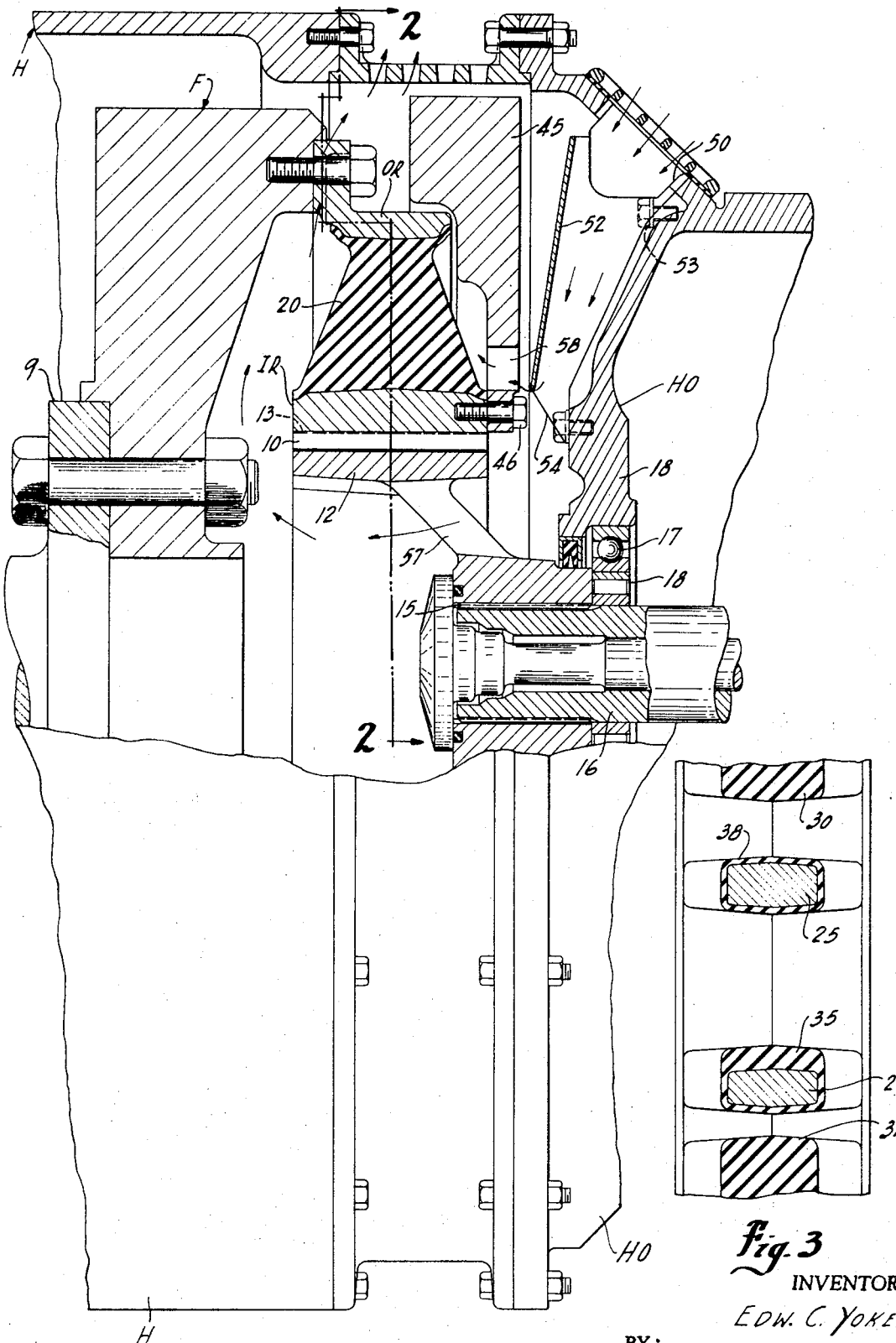
FIG. 1 is a longitudinal view, the view being partially in section, and having certain parts shown broken away or removed for the sake of clarity, through a portion of a power transmitting drive and including the flexible torsional coupling provided by the present invention.
FIG. 3 is a sectional view taken generally along the line 3—3 in FIG. 2.

The invention has been shown as applied to a marine gear drive where it finds particular utility due to the high shock loads and widely varying torque fluctuations found in such drives.

A stationary engine housing H encloses an engine driven flywheel F which receives its power from the engine shaft 9 and to which is bolted an outer, ring-like member OR. Thus, the flywheel acts to provide power into the coupling through the outer ring OR. The power is taken out of the coupling through an inner ring IR which is arranged concentrically with the outer ring and which inner ring has a set of internal gear teeth 10. A hub 12 having external teeth 13 in constant mesh with the gear teeth 10, is splined at 15 to the output shaft 16. The output shaft is journalled on the anti-friction bearing assembly 17 mounted in the generally radially extending flange 18 of the output housing HO. In a marine installation, shaft 16 would transmit power into the marine gear unit (not shown). The outer ring OR and the inner ring IR, constituting outer and inner concentric members, respectively, are connected together by means of a flexible material such as rubber 20 so that a certain amount of relative rotational movement between these members can occur. The rubber material is bonded to the inner and outer members, as will appear.

Figure 2:
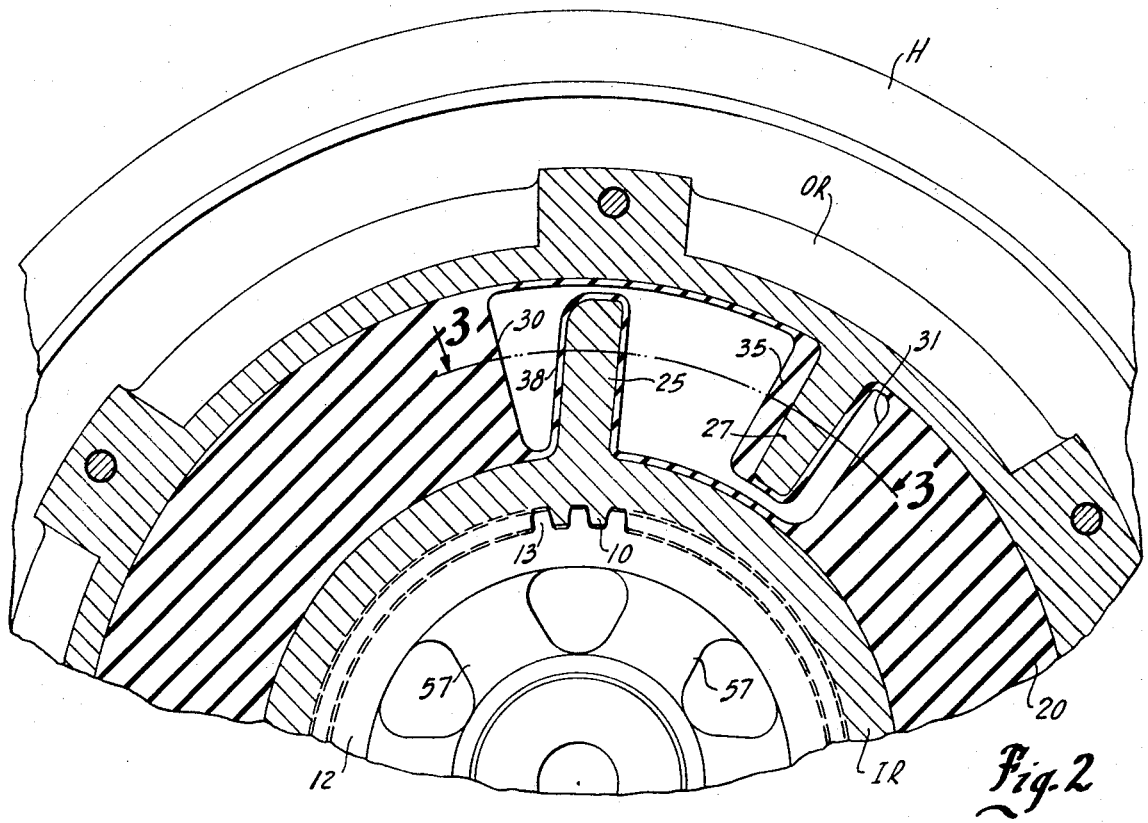
FIG. 2 is a sectional view taken generally along the line 2—2 in FIG. 1.

A mechanical drive connection is also provided between the inner and outer members but is normally in the disengaged position so that the drive is ordinarily transmitted through the rubber material. This mechanical drive includes a number of circumferentially spaced and generally radially extending abutments 25 that extend from the periphery of the inner member and are of such a radial length that they terminate short of the internal surface of the outer ring OR. The outer ring has a series of circumferentially spaced and generally radially inwardly extending abutments 27, one being located relatively closely adjacent the corresponding abutments 25 of the inner member. As shown in FIG. 2, when the coupling is in the normal position, the abutments 25 and 27 do not become engaged. It will be noted that the rubber material 20 does not fully fill the space, in a circumferential direction between the inner and outer members but, instead, several circumferentially spaced openings are provided between the members such as for example, the opening which extends from the radial wall 30 of the rubber material to the radial wall 31 of the rubber material.

Figure 4:
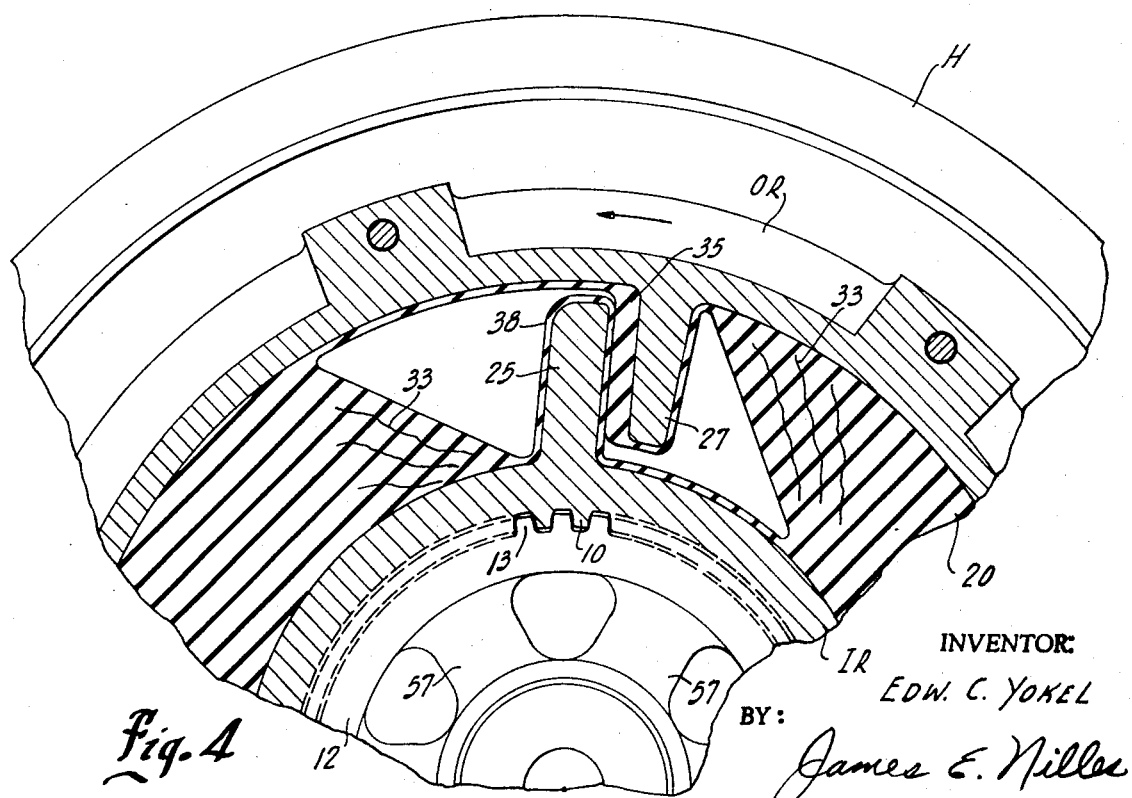
FIG. 4 is a view generally similar to FIG. 2, but showing the coupling when the resilient material is flexed sufficiently to permit the inter-engaging abutment to transmit the torque.

As shown in FIG. 4, when an excessive torque load is placed on the coupling and assuming the direction of engine rotation as shown by the curvilinear arrow, the radially extending abutment 27 of the outer member has moved circumferentially to a position where it engages or abuts against the abutment 25 of the inner member, thereby providing a mechanical or solid drive connection between the parts. As shown in this figure and under these conditions, the rubber material has acted in shear to stretch generally along the shear lines 33 indicated in FIG. 4.

It will be noted in FIG. 3 that the bare metal of the abutment 27 does not contact the bare metal of the abutment 25 but, instead, a rubber cushion 35 is bonded to that radial surface of abutment 27 located adjacent the abutment 25 of the inner member.

The rubber material is bonded to the surfaces of the inner and outer members as follows.

In making the coupling, the inner and outer members are positioned in a mold so that their relative abutments are arranged as shown in FIG. 2. The rubber is placed by injection molding in the appropriate spaces between the inner and outer mold. Prior to the placing of the rubber, however, the surfaces of the inner and outer mold to which the rubber is to be bonded, have been coated with an adhesive. Thus, when the rubber is then vulcanized and, consequently, bonded to the surfaces of the inner and outer members, and in accordance with the mold pattern, the walls 30 and 31 of the opening between the inner and outer members are formed and, furthermore, a thin layer of rubber 38 extends from the wall 30 and around each of the surfaces of the inner and outer members and their abutments, up to the radial wall 31. While this thin layer of rubber 38 is not necessarily required in the present drive, it does act to cover or coat the abutments and the inner and outer walls of the members so that it is unnecessary to finish what might otherwise be a rough surface on the metal members. In addition, a sufficient amount of rubber is provided to form the cushion 35 on the abutment 27 adjacent the side of the abutment 25.

Thus, the rubber is bonded through a considerable arcuate distance around the exterior of the inner member and also around the interior of the outer member or ring OR, thereby providing adequate bonded surface to the members for transmitting torque.

The tangential forces transmitted by the resilient material 20 varies throughout its radial dimension, because of the difference in the radius or moment arm through which the flexible material, at any radial location, works.

As shown in FIG. 1, the resilient material is of a radially outward converging shape, when viewed in longitudinal section. This provides a smaller axial length of the resilient material adjacent the outer ring than that adjacent the inner ring. With this construction of the flexible material, the stress in shear (or shear stress) is relatively constant throughout the radius because of these outwardly converging walls.

In order to lower the critical speed of the marine gear engine package in general and to smooth out variations in vibrations due to torque fluctuations, an inertia disc 45 may be bolted by bolt means 46 to the inner member. This disc, which may be of various cross-sectional shapes, act to add mass to the coupling inner ring and thereby lower the critical speed at which the unit may be operated. In this manner, the critical speed of the drive can be lowered by adding mass downstream of the coupling in respect to the direction of power flow.

Means for cooling the entire coupling are provided and includes an air inlet 50 in the housing which directs air into the sheet metal duct 52 which is fastened by bolt means 53 to the interior of the housing. Thus, cool air flows in the direction indicated by the curvilinear arrows and generally radially inwardly to the exit end 54 of the duct. At this point, the air can travel further radially inwardly and between the spokes 57 of the hub to the engine side of the coupling. Air can also travel through the openings 58 in the inertia disc 45 and then radially outwardly along the rearward side of the coupling and, more particularly, along the rubber material 20. This assures good cooling to the coupling, particular to the rubber material which may otherwise heat excessively due to the sometimes rapid and excessive shearing action imposed thereon.

RESUME

In marine drive installations, the drive from the engine to the propeller shaft is often reversed and without bringing the craft to a complete stop before the actual reversal is made. This is one situation in which high torque loads are imposed on the drive. The present invention provides a flexible drive coupling for such a situation and, furthermore, provides a mechanical drive connection in the event of failure of the flexible drive or in the event of excessive torque loads imposed thereon.

I claim:

1. A flexible torsional coupling for transmitting power and including an outer ring, an inner ring concentrically arranged with said outer ring and radially spaced therefrom, a resilient material located between said rings and bonded thereto for transmitting torque between said rings, said inner ring having an outwardly and radially extending abutment, said outer ring having an inwardly and radially extending abutment, said radially extending abutments being circumferentially spaced from one another to provide an opening therebetween whereby said abutments are normally out of engagement with one another so that torque is transmitted by said resilient material, said resilient material also being bonded to said abutments along the radially extending sides thereof, said material also defining an opening adjacent said abutments along that side of said abutment which is opposite to the adjacent abutment to thereby permit flexing of said material away from said abutment, the material bonded abutment of said outer ring adapted to bear against the material bonded abutment of said inner ring when said resilient material torsionally stretches beyond a predetermined point.

2. The coupling set forth in claim 1 further characterized in that said resilient material is of generally converging cross-section shape in a radially outwardly extending direction, whereby the shear stress in said resilient material adjacent said inner ring is approximately the same as the shear stress in the resilient material adjacent said outer ring.

3. The coupling set forth in claim 1 including a central hub having external gear teeth, said inner ring has internal gear teeth in constant mesh with the external teeth of said hub, and said hub has means for driving connection with a shaft.

4. The coupling set forth in claim 1 further characterized in that said inner ring has inertia plate means affixed thereto for creating additional mass.

5. The coupling set forth in claim 1 including an engine housing, said coupling is rotatable within said housing, and cooling air duct means within said housing and placing the exterior of said housing in air communication with said resilient material whereby as said coupling rotates, it acts to suck air through duct means and past said resilient material.

6. A flexible torsional coupling for transmitting power and including an outer ring, an inner ring concentrically arranged with said outer ring and radially spaced therefrom, a resilient material located between said rings and bonded thereto for transmitting torque between said rings, said resilient material being of generally converging cross-section shape in a radially outwardly-extending direction, whereby the shear stress in said resilient material adjacent said inner ring is approximately the same as the shear stress in the resilient material adjacent said outer ring, said inner ring having an outwardly and radially extending abutment, said outer ring having an inwardly and radially extending abutment, said radially extending abutments being circumferentially spaced from one another to provide an opening therebetween whereby said abutments are normally out of engagement with one another so that torque is transmitted by said resilient material, said resilient material also being bonded to said abutments along the radially extending sides thereof, said material also defining an opening adjacent said abutments along that side of said abutment which is opposite to the adjacent abutment to thereby permit flexing of said material away from said abutment, the material bonded abutment of one of said rings having a cushion of resilient material bonded thereto and on its side which is located adjacent the abutment of said other ring, the abutment of said outer ring adapted to bear against the abutment of said inner ring when a predetermined amount of torque causes said resilient material to torsionally stretch beyond a predetermined point.

7. The coupling set forth in claim 6 including a central hub having external gear teeth, said inner ring has internal gear teeth in constant mesh with the external teeth of said hub, and said hub has means for driving connection with a shaft.

8. The coupling set forth in claim 6 further characterized in that said inner ring has inertia plate means affixed thereto for creating additional mass.

9. The coupling set forth in claim 6 including an engine housing, said coupling is rotatable within said housing, and cooling air duct means within said housing and placing the exterior of said housing in air communication with said resilient material whereby as said coupling rotates, it acts to suck air through said duct means and past said resilient material.

10. A marine power transmission including an engine flywheel, a power shaft, and a flexible torsional coupling for transmitting power from said flywheel to said shaft, said coupling comprising an outer ring fixed to said flywheel, an inner ring concentrically arranged with said outer ring and radially spaced therefrom, a resilient material located between said rings and bonded thereto for transmitting torque between said rings, said inner ring having an outwardly and radially extending abutment, said outer ring having an inwardly and radially extending abutment, said radially extending abutments being circumferentially spaced from one another to provide an opening therebetween whereby said abutments are normally out of engagement with one another so that torque is transmitted by said resilient material, said resilient material also being bonded to said abutments along the radially extending sides thereof, said material also defining an opening adjacent said abutments along that side of said abutment which is opposite to the adjacent abutment to thereby permit flexing of said material away from said abutment, the material bonded abutment of said outer ring adapted to bear against the material bonded abutment of said inner ring when said resilient material torsionally stretches beyond a predetermined point; and means connecting said inner ring to said shaft.

11. The coupling set forth in claim 10 further characterized in that said resilient material is of generally converging cross-section shape in a radially outwardly extending direction, whereby the shear stress in said resilient material adjacent said inner ring is approximately the same as the shear stress in the resilient material adjacent said outer ring.

12. The coupling of claim 10 wherein said means includes a central hub having external gear teeth, said inner ring has internal gear teeth in constant mesh with the external teeth of said hub, and said hub has means for driving connection with a shaft.

13. The coupling of claim 10 further characterized in that said inner ring has inertia plate means affixed thereto for creating additional mass.

14. A marine power transmission including an engine housing, an engine flywheel rotatably mounted in said engine housing, an output housing secured to said engine housing, a power shaft journalled in said output housing, and a flexible torsional coupling for transmitting power from said flywheel to said shaft, said coupling comprising an outer ring fixed to said flywheel, an inner ring concentrically arranged with said outer ring and radially spaced therefrom, a resilient material located between said rings and bonded thereto for transmitting torque between said rings, said inner ring having an outwardly and radially extending abutment, said outer ring having an inwardly and radially extending abutment, said abutments normally being out of engagement with one another so that torque is transmitted by said resilient material said resilient material also being bonded to said abutments along the radially extending sides thereof, said material also defining an opening adjacent said abutments along that side of said abutment which is opposite to the adjacent abutment to thereby permit flexing of said material away from said abutment, the abutment of said outer ring adapted to bear against the abutment of said inner ring when said resilient material torsionally stretches beyond a predetermined point; means connecting said inner ring to said shaft; and cooling air duct means within said output housing and placing the exterior of said output housing in air communication with said resilient material whereby as said coupling rotates, it acts to suck air through said duct means and past said resilient material.

15. The coupling set forth in claim 14 further characterized in that said resilient material is of generally converging cross-section shape in a radially outwardly extending direction, whereby the shear stress in said resilient material adjacent said inner ring is approximately the same as the shear stress in the resilient material adjacent said outer ring.

16. The coupling set forth in claim 14 wherein said connecting means includes a central hub having external gear teeth, said inner ring has internal gear teeth in constant mesh with the external teeth of said hub, and said hub has means for driving connection with a shaft.

* * * * *